(No Model.) 2 Sheets—Sheet 1.
J. L. STROCK.
GRASS SEED SOWING MACHINE.
No. 338,204. Patented Mar. 16, 1886.
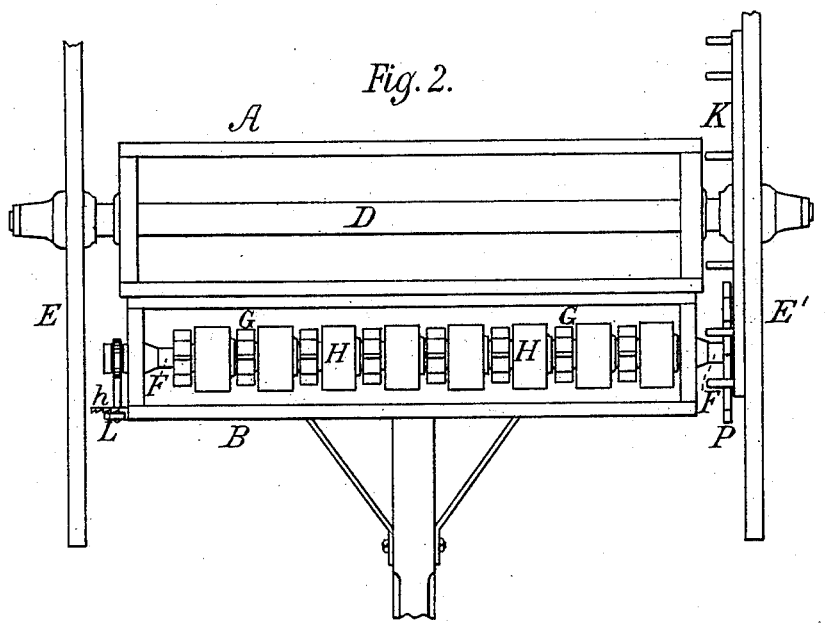
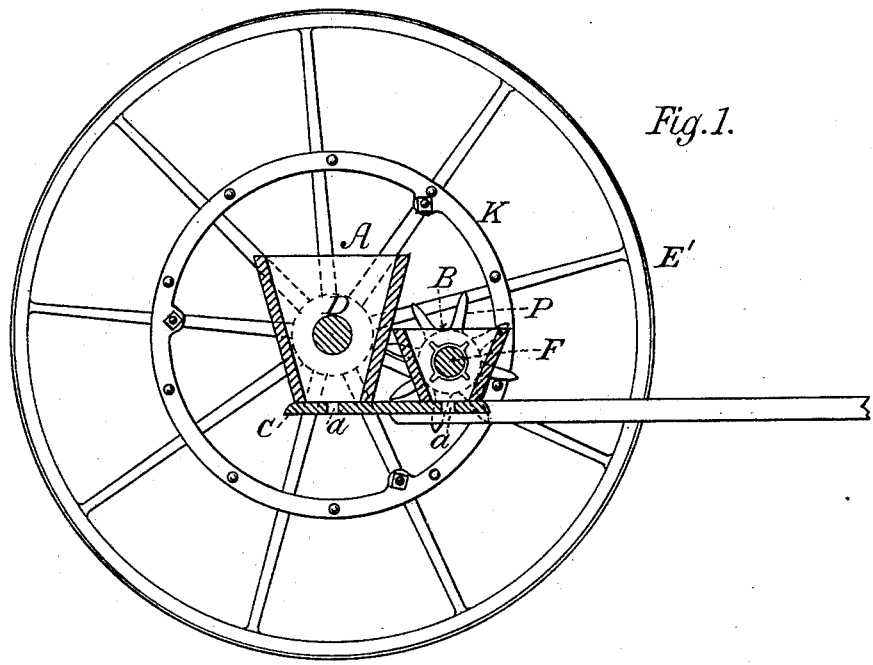
Witnesses:
Inventor:
John Lahman Strock
by Fred. Artós
his Atty.

(No Model.) 2 Sheets—Sheet 2.
J. L. STROCK.
GRASS SEED SOWING MACHINE.
No. 338,204. Patented Mar. 16, 1886.
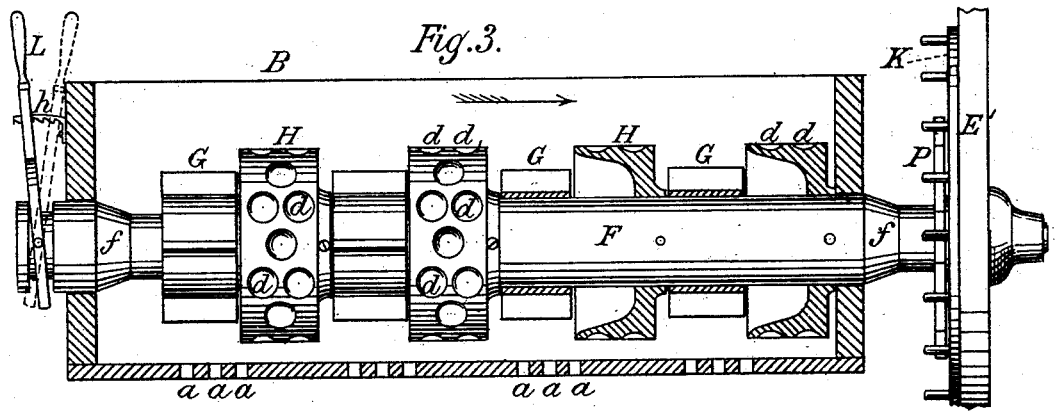
Fig. 3.
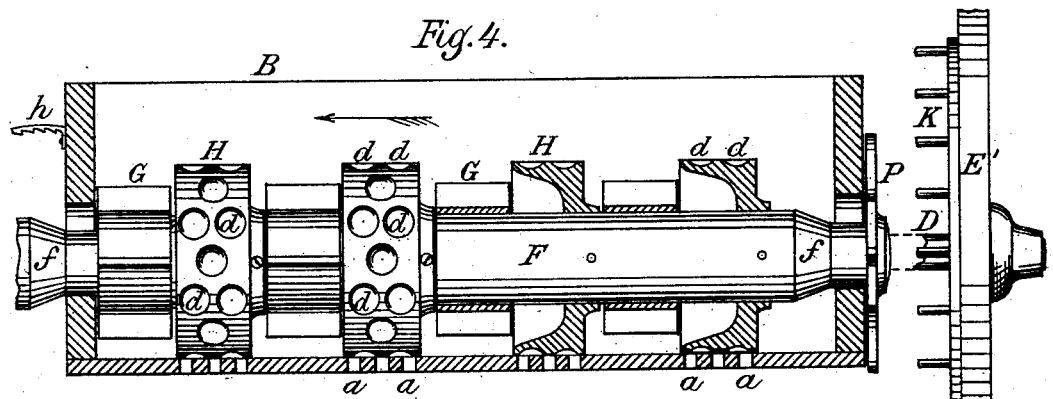
Fig. 4.
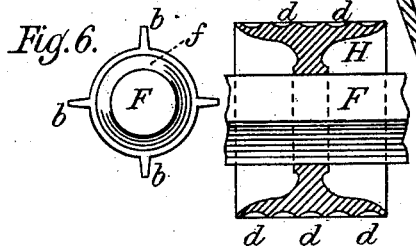
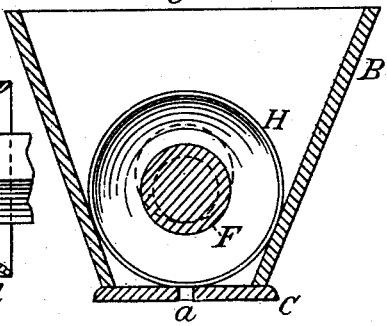
Fig. 6. Fig. 7. Fig. 5.
Witnesses:
Inventor:
John Lahman Strock
by Fred. Arto's
his Atty.

UNITED STATES PATENT OFFICE.

JOHN LAHMAN STROCK, OF FRANKLIN GROVE, ILLINOIS.

GRASS-SEED-SOWING MACHINE.

SPECIFICATION forming part of Letters Patent No. 338,204, dated March 16, 1886.

Application filed October 20, 1884. Serial No. 145,984. (No model.)

*To all whom it may concern:*

Be it known that I, JOHN LAHMAN STROCK, a citizen of the United States of America, residing at Franklin Grove, in the county of Lee and State of Illinois, have invented new and useful Improvements in Grass-Seed-Sowing Machines, of which the following is a specification.

My invention relates to combined seeders for sowing grass or clover seed with other cereals—such as wheat, oats, &c.—wherein a grass-seed hopper and a counter-shaft are arranged parallel to the axle and driven by gearing upon the supporting-wheels, the said counter-shaft being provided with agitators for separating and distributing the clogged seed, in combination with means for regulating the quantity of seed to be sown.

The improvement consists, primarily, in a shaft provided with conical or tapered bearings supporting seed-carrying wheels and adapted to be moved endwise, to lift the carrying-wheels above the bottom of the hopper to a greater or less extent, and correspondingly increase or decrease the size and number of discharge-openings through which the seed pass, and consequently vary the quantity of seed sown over the area of land-surface the apparatus is passing.

The improvement further consists in combining alternately-arranged agitators and grain-carrying wheels upon an endwise-moving shaft with a hopper provided with perforations arranged in groups corresponding in number with the seed-carrying wheels, the perforations in the bottom of the hopper corresponding with the number of rows of seed-cups upon the seed-wheels, as will hereinafter fully appear.

In the accompanying drawings, Figure 1 is a sectional side elevation of the machine, showing the interior of the hoppers and the discharge-openings; Fig. 2, a plan of the machine. Figs. 3 and 4 are enlarged longitudinal sectional elevations in detail of the grass-seed hopper, counter-shaft, agitator, and seed-carrying wheels, the last-named figures showing, respectively, the counter-shaft and the parts connected therewith, first in a raised and then in a lowered position, to illustrate the extreme positions fully opened and closed; Fig. 5, an enlarged cross-section through the hopper and seed-carrying wheels; Fig. 6, an end view of the counter-shaft and agitating wheel or collar, and Fig. 7 a sectional view of a seed-carrying wheel enlarged and somewhat modified in having both of its faces concaved or dished.

I will now describe more specifically the details of my improved machine, like letters of reference indicating like parts in all the figures.

The grass-seed-sowing machine is composed of two hoppers—a larger one, A, and a smaller hopper, B—both secured to a common base and frame, C, and arranged parallel with each other, the larger hopper, A, being arranged in rear of the smaller hopper, B, the latter carrying the grass-seed, and the former carrying the cereals. The whole apparatus is mounted on two driving-wheels, E E', secured to an axle, D, which passes through and revolves within the larger hopper, A, in any well-known or preferred manner. A counter-shaft, F, arranged parallel to the axle D, passes in a similar manner through the hopper B, and upon said shaft is mounted a series of agitator wheels or collars, G G, provided with projecting blades *b*, which serve effectively to stir up and separate the adhesive seed. There are also seed carrying and distributing wheels H H secured upon the shaft F, and arranged intermediately with the agitator-wheels G G, and are formed with cup-shaped depressions *d* upon their periphery, each wheel in this instance being provided with three sets or annular rows of cups corresponding in number and distance from each other with seed-openings *a a a*, formed through the bottom of the grass-seed hopper B. It will be perceived that when the seed-carrying-wheels H H are in their lowered position, to revolve in close contact with the bottom of the hopper, the amount of seed passed through the openings *a a* will be limited to the amount of seed carried around by the cup-sloped depressions *d d*.

The shaft F has its end bearings partially tapered at *f f* in proportion to the distance or length of its endwise movement. As the shaft F is moved endwise, the seed-carrying wheels H H will move away from the openings *a a* and uncover them to a greater or less extent in proportion to the distance moved.

The endwise movement of the shaft is effected by means of a hand-lever, L, and rock-bar $h$ in a well-known manner.

The shaft F is driven by a toothed wheel, K, upon the face of the supporting-wheel E', which engages with a pinion, P, secured to the shaft F, the teeth projecting from the wheel K a sufficient distance to move the pinion P during a considerable portion of the endwise movement of the shaft F, to effect the rotation of said shaft under different positions of adjustment.

I claim as my invention and desire to secure by Letters Patent—

1. In a grass-seeding machine, the combination, with the hopper, of an endwise-moving shaft, F, provided with tapered bearings, seed-carrying wheels H, provided with cups or depressions formed in its periphery, and a hopper provided with seed-discharge openings formed in the bottom thereof, substantially as and for the purpose described.

2. The combination of the seed-hopper B, the endwise-moving shaft F, provided with tapered bearings $f$, agitators G, seed-carrying wheels H, provided with cup-sloped depressions in its periphery, and a hopper provided with a series of seed-discharge openings arranged in groups and corresponding in number and position with the annular rows of cups in the seed-carrying wheels, substantially as described, for the purpose specified.

In testimony whereof I have set hereunto my hand in the presence of two subscribing witnesses.

JOHN LAHMAN STROCK.

Witnesses:
CLARENCE W. LAHMAN,
JACOB C. BROWN.